Figure 1:
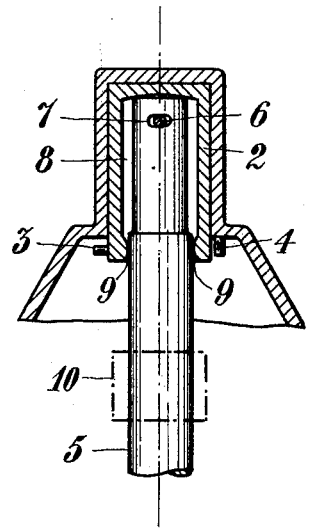

P. T. SUNDBERG.
MEANS FOR SUPPORTING RAPIDLY ROTATING BODIES.
APPLICATION FILED JUNE 9, 1911.

1,113,712.

Patented Oct. 13, 1914.

UNITED STATES PATENT OFFICE.

PER TEODOR SUNDBERG, OF STOCKHOLM, SWEDEN, ASSIGNOR TO MASKIN- OCH BROBYGGNADS AKTIEBOLAGET, OF HELSINGFORS, FINLAND.

MEANS FOR SUPPORTING RAPIDLY-ROTATING BODIES.

1,113,712.   Specification of Letters Patent.   Patented Oct. 13, 1914.

Application filed June 9, 1911. Serial No. 632,213.

*To all whom it may concern:*

Be it known that I, PER TEODOR SUNDBERG, a subject of the King of Sweden, residing at Stockholm, Sweden, have invented new and useful Improvements in Means for Supporting Rapidly-Rotating Bodies, of which the following is a specification, reference being had to the drawing accompanying and forming a part hereof.

In rapidly rotating bodies, such as centrifugal drums, which are carried by vertical spindles, the rotary body has been placed loosely on the spindle, usually on the top thereof, so as to enable the rotary body always to place itself in a position in which its center of gravity is just below the point of suspension. Although the rotary body has thus been free to balance itself, it could not be avoided that the balancing of the body took place under strong vibrations, which is, obviously, objectionable in several respects. This drawback seems to be due to the fact that the point of suspension has not been movable relatively to the rotary body, i. e. the said body and the spindle have been practically inseparable at the point of suspension.

The object of the invention is to remove the said drawback and provide such a suspension for the rotary body that the said body will always run quietly, even if the body is more or less unbalanced.

The invention consists, chiefly, in this that the point of suspension is movable laterally in relation to the rotary body, i. e. the spindle carrying the rotary body is adapted to swing laterally in relation to the said body about a point situated on the axis thereof, below or above the point of suspension.

The invention further comprises the construction and combination of parts hereinafter more particularly set forth.

In the drawing, I have shown, by way of example, a centrifugal drum suspended on the top of a vertical spindle in a manner embodying the invention.

Figure 2:
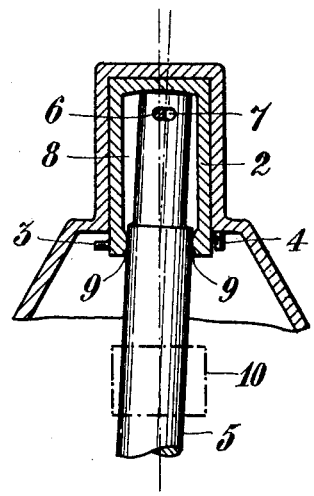

Figure 1 shows the drum in normal position, in which the axis of the drum coincides with the axis of the spindle. Fig. 2 shows the drum in a position in which the axis of the drum forms an angle with the axis of the spindle.

Referring to the drawing, the drum 1 is mounted on a sleeve 2. In the embodiment shown, movement is transmitted from the sleeve to the drum by means of pins 3 and 4, but it is obvious that the connection between the two parts may be of any kind whatsoever. The sleeve 2 is placed on the top of the spindle 5. The movement of the rotary spindle is transmitted to the sleeve by means of a pin 6 fixed thereto and adapted to move freely in a larger hole 7 in the spindle so as not to prevent necessary movement between the upper convex end of the spindle and the corresponding concave surface of the sleeve 2. The upper part of the spindle 5 has a smaller diameter so that there is a certain play 8 between the spindle 5 and the sleeve 2 above a somewhat contracted part 9 of the latter. Preferably, the top of the spindle 5 and the corresponding surface of the sleeve 2 are formed according to a sphere having its center in the horizontal plane through the contracted part 9 of the sleeve 2. The spindle 5 is journaled in a suitable resilient box bearing 10.

When the drum 1 swings about the spindle 5, at the contracted part 9 of the sleeve 2, the spindle 5 slides correspondingly on the inner surface of the sleeve 2. By this sliding movement the center of gravity of the drum is caused to coincide with the axis of rotation, by which the conditions for a quiet running are fulfilled.

I claim:

1. In a centrifugal machine, the combination with a vertical spindle, of a rotary body supported loosely upon the upper end of such spindle, the supporting surface of the spindle being of lesser width than the corresponding surface of the rotary body, said rotary body encircling and bearing against the spindle in a plane below the upper end of the spindle and arranged to oscillate about a point approximately in said plane, substantially as and for the purpose set forth.

2. In a centrifugal machine, the combination with a vertical spindle, of a rotary body supported loosely upon the upper end of such spindle, and provided with a sleeve surrounding the end of the spindle, the supporting surface of the spindle being of lesser width than the corresponding surface of the sleeve, said sleeve encircling and bearing against the spindle in a plane below the upper end of the spindle and arranged to oscillate about a point approximately in said plane, substantially as and for the purpose set forth.

3. In a centrifugal machine, the combination with a vertical spindle, of a rotary body supported loosely upon the upper end of such spindle, the supporting surface of the spindle being of lesser width than the corresponding surface of the rotary body, said rotary body encircling and bearing against the spindle in a plane below the upper end of the spindle and arranged to oscillate about a point approximately in said plane, the part of the rotary body adjacent to the said end of the spindle as well as said end of the spindle being formed according to a sphere having its center in the said point, substantially as and for the purpose set forth.

4. In a centrifugal machine, the combination with a vertical spindle, of a rotary body supported loosely upon the upper end of such spindle and provided with a sleeve surrounding the end of the spindle, the supporting end of the spindle being of lesser width than the corresponding surface of the sleeve, said sleeve encircling and bearing against the spindle in a plane below the upper end of the spindle and arranged to oscillate about a point approximately in said plane, the part of the sleeve adjacent to the said end of the spindle as well as said end of the spindle being formed according to a sphere having its center in the said point, substantially as and for the purpose set forth.

PER TEODOR SUNDBERG.

Witnesses:
FRANTZ MARTINSEN,
WERNER KARSTEN.

Copies of this patent may be obtained for five cents each, by addressing the "Commissioner of Patents, Washington, D. C."